US012129439B2

(12) United States Patent
Greager et al.

(10) Patent No.: US 12,129,439 B2
(45) Date of Patent: Oct. 29, 2024

(54) PROCESS FOR THE MANUFACTURE OF A USEFUL PRODUCT FROM WASTE MATERIALS AND/OR BIOMASS

(71) Applicant: Velocys Technologies Limited, Oxford (GB)

(72) Inventors: Ivan Philip Greager, Houston, TX (US); Roger Allen Harris, Houston, TX (US); Neil Alexander King, Oxford (GB); Soumitra R. Deshmukh, Houston, TX (US); Zheyan Qiu, Sugar Land, TX (US); Ashish Gupta, Houston, TX (US)

(73) Assignee: Velocys Technologies Limited, Oxford (GB)

( * ) Notice: Subject to any disclaimer, the term of this patent is extended or adjusted under 35 U.S.C. 154(b) by 113 days.

(21) Appl. No.: 17/912,684

(22) PCT Filed: Mar. 16, 2021

(86) PCT No.: PCT/EP2021/056672
§ 371 (c)(1),
(2) Date: Sep. 19, 2022

(87) PCT Pub. No.: WO2021/185827
PCT Pub. Date: Sep. 23, 2021

(65) Prior Publication Data
US 2023/0174878 A1   Jun. 8, 2023

Related U.S. Application Data

(60) Provisional application No. 62/990,702, filed on Mar. 17, 2020.

(30) Foreign Application Priority Data

Apr. 8, 2020 (GB) ........................... 2005217

(51) Int. Cl.
*C10J 3/72* (2006.01)
*C01B 3/36* (2006.01)
(Continued)

(52) U.S. Cl.
CPC ................. *C10J 3/721* (2013.01); *C01B 3/36* (2013.01); *C01B 3/48* (2013.01); *C01B 3/52* (2013.01);
(Continued)

(58) Field of Classification Search
CPC ...... C10J 3/721; C10J 3/82; C10J 2300/0916; C10J 2300/092; C10J 2300/1618;
(Continued)

(56) References Cited

U.S. PATENT DOCUMENTS

| 4,110,359 A | 8/1978 | Marion |
| 2009/0012188 A1* | 1/2009 | Rojey ...................... C01B 3/36 518/700 |

(Continued)

FOREIGN PATENT DOCUMENTS

| EP | 2865732 A1 | 4/2015 |
| EP | 1934311 B1 | 7/2016 |

(Continued)

OTHER PUBLICATIONS

Combined Search and Examination Report for related Great Britain Application No. GB2005217.1 dated Aug. 14, 2020.
(Continued)

*Primary Examiner* — Randy Boyer
*Assistant Examiner* — Juan C Valencia
(74) *Attorney, Agent, or Firm* — Renner, Otto, Boisselle & Sklar, LLP

(57) ABSTRACT

The present invention provides a process for the manufacture of a useful product from carbonaceous feedstock of
(Continued)

fluctuating compositional characteristics, the process comprising the steps of: continuously providing the carbonaceous feedstock of fluctuating compositional characteristics to a gasification zone; gasifying the carbonaceous feedstock in the gasification zone to obtain raw synthesis gas; recovering at least part of the raw synthesis gas from the gasification zone and supplying at least part of the recovered raw synthesis gas to a partial oxidation zone; equilibrating the $H_2$:CO ratio of the raw synthesis gas in the partial oxidation zone to obtain equilibrated synthesis gas; recovering at least part of the equilibrated synthesis gas from the partial oxidation zone and treating the gas to remove impurities and generate a fine synthesis gas; optionally adjusting the $H_2$:CO ratio of at least part of the fine synthesis gas to obtain adjusted fine synthesis gas; and converting the optionally adjusted fine synthesis gas into the useful product in a further chemical reaction requiring a usage ratio; wherein the fine synthesis gas H2:CO ratio is below the usage ratio and wherein any optional adjustment of at least part of the fine synthesis gas $H_2$:CO ratio is effective to increase the $H_2$:CO ratio in the fine synthesis gas to a level at, nearer to or above the usage ratio; wherein the $H_2$:CO ratio of the raw synthesis gas fluctuates during operation of the process as a result of the fluctuating compositional characteristics of the carbonaceous feedstock by a percentage of ±x; and the $H_2$:CO ratio of the equilibrated synthesis gas does not fluctuate during operation of the process or fluctuates during operation of the process as a result of the fluctuating compositional characteristics of the carbonaceous feedstock by a percentage ±y, y being a lower percentage than x.

20 Claims, 2 Drawing Sheets

(51) Int. Cl.

| | | |
|---|---|---|
| C01B 3/48 | (2006.01) | |
| C01B 3/52 | (2006.01) | |
| C01B 3/56 | (2006.01) | |
| C10G 2/00 | (2006.01) | |
| C10G 45/58 | (2006.01) | |
| C10G 47/00 | (2006.01) | |
| C10G 65/12 | (2006.01) | |
| C10J 3/82 | (2006.01) | |
| C10K 3/00 | (2006.01) | |
| C10K 3/04 | (2006.01) | |

(52) U.S. Cl.
CPC .................. *C01B 3/56* (2013.01); *C10G 2/30* (2013.01); *C10G 2/32* (2013.01); *C10G 45/58* (2013.01); *C10G 47/00* (2013.01); *C10G 65/12* (2013.01); *C10J 3/82* (2013.01); *C10K 3/005* (2013.01); *C10K 3/04* (2013.01); *C01B 2203/0255* (2013.01); *C01B 2203/0283* (2013.01); *C01B 2203/0415* (2013.01); *C01B 2203/042* (2013.01); *C01B 2203/0475* (2013.01); *C01B 2203/0485* (2013.01); *C01B 2203/062* (2013.01); *C01P 2006/80* (2013.01); *C10G 2300/1022* (2013.01); *C10G 2400/02* (2013.01); *C10G 2400/08* (2013.01); *C10J 2300/0916* (2013.01); *C10J 2300/092* (2013.01); *C10J 2300/0946* (2013.01); *C10J 2300/1618* (2013.01); *C10J 2300/1656* (2013.01); *C10J 2300/1659* (2013.01)

(58) Field of Classification Search
CPC ....... C10J 2300/1656; C10J 2300/1659; C01B 3/36; C01B 2203/0255; C01B 2203/0475; C01B 2203/0485; C01B 2203/062; C10G 2/30; C10G 45/58; C10G 47/00; C10G 65/12; C10G 2300/1022; C10G 2400/02; C10G 2400/08

See application file for complete search history.

(56) References Cited

U.S. PATENT DOCUMENTS

| | | |
|---|---|---|
| 2015/0299589 A1 | 10/2015 | Bryan et al. |
| 2019/0118157 A1 | 4/2019 | Chandran et al. |
| 2019/0291351 A1 | 9/2019 | Lysne et al. |
| 2021/0292666 A1 | 9/2021 | Greager et al. |

FOREIGN PATENT DOCUMENTS

| | | | | |
|---|---|---|---|---|
| EP | 2694432 | B1 | 6/2018 | |
| EP | 2694624 | B1 | 10/2018 | |
| EP | 2530136 | B1 | 4/2020 | |
| EP | 3381997 | B1 | 6/2020 | |
| EP | 2350233 | B1 | 9/2020 | |
| WO | 2008010994 | A2 | 1/2008 | |
| WO | 2008017741 | A1 | 2/2008 | |
| WO | WO-2013068643 | A1 * | 5/2013 | ............ C01B 3/382 |
| WO | 2017011025 | A1 | 1/2017 | |
| WO | 2017039741 | A1 | 3/2017 | |
| WO | 2018026388 | A1 | 2/2018 | |

OTHER PUBLICATIONS

International Search Report for related International Application No. PCT/EP2021/056672 mailed Jul. 8, 2021.
International Preliminary Report on Patentability for related International Application No. PCT/EP2021/056672 dated Sep. 20, 2022.

* cited by examiner

PROCESS FOR THE MANUFACTURE OF A USEFUL PRODUCT FROM WASTE MATERIALS AND/OR BIOMASS

TECHNICAL FIELD

The present invention concerns a chemical engineering process for the production of useful products, for example synthetic fuels, from waste materials and/or biomass in a manner which improves efficiency and reduces the complexity of the process in comparison with conventional processes of the type.

BACKGROUND

It is widely known in the art to manufacture useful products such as synthetic fuels from waste materials and/or biomass. We may refer to such manufacturing methods as WTL (Waste-to-Liquids) and BTL (Biomass-to-Liquids) processes.

Typical WTL and BTL processes involve the gasification by steam reforming of waste or biomass feedstock to produce a raw synthesis gas which may then be treated and purified in various ways before entering a chemical reaction train to generate a useful product.

In the case of the useful product being a synthetic fuel, the chemical reaction train will typically comprise a Fischer-Tropsch (FT) reactor. The FT process is widely used to generate fuels from carbon monoxide and hydrogen and can be represented by the equation:

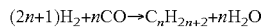

$$(2n+1)H_2 + nCO \rightarrow C_nH_{2n+2} + nH_2O$$

The so-called usage ratio is an indication of the required stoichiometry in the chemical reaction train. For an FT process the usage ratio approximates ideally to 2 when n is a large number in the above equation. For example when n=100 the ratio is 2.01. It will be appreciated that in a complex reaction network, side reactions may occur in which case the overall usage ratio and the primary reaction stoichiometry may not be synonymous and further both of these can be different from the ratio of reactants made available for the reaction. For example, in the case of FT the usage ratio in reality is typically in the range of 2.04 to 2.14, while the $H_2$:CO ratio in the feed can vary significantly.

To date, there appears to have been little consideration given as to how the feed $H_2$:CO ratio may be controlled below the usage ratio to increase efficiency and reduce complexity in an otherwise satisfactory WTL or BTL process.

WTL and BTL processes are very well known in the art and certain processes have been considered for the production of fuel from sources such as municipal and biomass waste.

For example, WO2017011025A1 and WO2017039741A1 concern systems for producing high biogenic carbon concentration Fischer-Tropsch (F-T) liquids derived from municipal solid wastes (MSW), and a high biogenic content fuel derived from renewable organic feedstock sources.

EP2350233A1 relates to a method for producing liquid hydrocarbonaceous product from solid biomass, the method comprising gasifying solid biomass to produce raw synthesis gas, conditioning the raw synthesis gas to obtain purified synthesis gas and subjecting the purified gas to a Fischer-Tropsch synthesis.

WO2018026388 describes converting one or more carbon-containing feedstocks into hydrocarbons.

US20190118157A1 relates to a synthesis gas production method in which the ratio of product gas components (both $H_2$:CO and CO:$CO_2$) is controlled and adjusted by substoichiometric (partial) oxidation and subsequent oxidation of a raw synthesis gas. The disclosure suggests to combine product gas from a partial oxidation unit and from a gasifier and to react the combined stream with an oxygen-containing gas to generate a lower component ratio than either the of the product gases from the partial oxidation unit or the gasifier.

EP3381997A1 and EP2694432A2 appear primarily concerned with the CO:$CO_2$ ratio in synthesis gas production and mention $H_2$:CO ratio only in passing.

EP2694624B1 is similarly preoccupied with the CO:$CO_2$ ratio.

The significance of the $H_2$:CO ratio is recognised in EP2530136A1 which discloses that a gasifier operated at 700 to 950° C. conventionally produces a $H_2$:CO ratio of about 0.5 to 1.4 depending on feedstock. This document teaches recovering from the Fischer-Tropsch reactor an off-gas comprising hydrocarbons, separately producing hydrogen from those gaseous hydrocarbons and feeding at least a part of the thus-produced hydrogen into the clean synthesis gas in order to increase the hydrogen-to-carbon monoxide ratio of said clean synthesis gas.

Much consideration of $H_2$:CO ratios is also provided in EP2865732A, which focuses on mixing raw synthesis gas from a biomass gasifier and a hydrogen-rich gas to yield a mixed gas, wherein a volume ratio of the hydrogen-rich gas to the raw synthesis gas is between 0.7 and 2.1 and then generating from that raw synthesis gas a fine synthesis gas having a $H_2$:CO volume ratio of between 1.8 and 3.0.

Fischer-Tropsch is by no means the only synthesis to benefit from consideration of component gas ratios. For example, EP1934311A1 discusses usage ratios in terms of "stoichiometric number" (SN) and teaches the adjustment of SN to a suitable value for use in methanol synthesis.

It is also known, for example from Taherzadeh, Mohammad & Chandolias, Konstantinos & Richards, Tobias. (2018). *Combined Gasification-Fermentation Process in Waste Biorefinery.* 10.1016/8978-0-444-63992-9.00005-7 that different feedstocks on gasification generate synthesis gas of different composition, including as regards the $H_2$:CO ratio.

US2015/0299589 describes a method of processing synthesis gas to improve the quality of the synthesis gas by using a water gas shift reaction to increase the molar ratio of hydrogen to carbon monoxide ($H_2$:CO).

WO2008/017741 describes a method of producing liquid hydrocarbons from a heavy charge such as biomass, coal, lignite, or heavy petroleum residue comprising partial oxidation of the heavy charge, producing a synthetic gas SG1, with $H_2$/CO ratio of <1, steam reforming a light charge comprising hydrocarbons having at most four carbon atoms, to produce a synthetic gas SG2 with $H_2$/CO ratio>3, a Fischer-Tropsch conversion of a synthetic gas SG into liquid hydrocarbons, mixture of at least one part of SG1 and at least one part of SG2, in proportions such that SG has a $H_2$/CO ratio of between 1.2 and 2.5.

US2009/0012188 describes a process of producing liquid hydrocarbons from a feedstock that comprises at least one elementary feedstock from the group of biomass, coal, lignite, petroleum residues, methane, and natural gas, comprising at least one stage a) for gasification of the feedstock by partial oxidation and/or steam reforming to produce a synthesis gas SG; a stage b) for separating $CO_2$ from SG and a portion of the effluent of the subsequent stage c); the mixing of a portion of the $CO_2$ that is separated with a gas of an $H_2/CO$ ratio of more than 3; a stage c) for partial conversion with hydrogen, thermal or thermocatalytic, of the $CO_2$ that is present in said first mixture according to the reaction: $CO_2+H_2 \rightarrow CO+H_2O$ in a specific reaction zone that is separated from said gasification zone or zones; a stage d) for Fisher-Tropsch synthesis on a synthesis gas that comprises at least a portion of SG and at least a portion of the CO that is produced by the conversion of $CO_2$ into hydrogen.

U.S. Pat. No. 4,110,359 describes a continuous process for simultaneously producing a stream of cleaned purified synthesis gas having a mole ratio $H_2:CO$ in the range of 2 to 12 and a separate stream of CO-rich gas.

WO2008/010994 describes a method for controlling a synthesis gas composition obtained from a steam methane reformer (SMR) that obtains its feedstock as product gas directly from a steam hydro-gasification reactor (SHR).

It would appear that none of these documents provides a satisfactory means for controlling the $H_2:CO$ ratio in the feed to be below the usage ratio to increase efficiency and reduce complexity in an otherwise satisfactory WTL or BTL process. In particular, none contain any satisfactory teaching as to how to handle compositionally fluctuating feedstocks.

The object of the present invention is to provide an improved process for manufacturing a useful product such as synthetic fuel from waste materials and/or biomass, in which the $H_2:CO$ ratio in the feed is controlled to be below the usage ratio to increase efficiency and reduce complexity in comparison with conventional such processes.

SUMMARY OF INVENTION

According to the present invention there is provided a process for the manufacture of a useful product from waste materials and/or biomass by producing a synthesis gas from a feedstock material and subsequently converting the synthesis gas to a useful product in a conversion process having a particular $H_2:CO$ in relation to the usage ratio, the process comprising:

selecting for a first period of time a first carbonaceous feedstock material comprising or derived from waste materials and/or biomass;

gasifying in a gasification zone at least part of the first carbonaceous feedstock material to produce a first raw synthesis gas having a first raw synthesis gas $H_2:CO$ ratio;

partially oxidising in a partial oxidation zone at least part of the first raw synthesis gas to produce a first equilibrated synthesis gas having a first equilibrated synthesis gas $H_2:CO$ ratio controlled to be below the usage $H_2:CO$ ratio of the conversion process;

treating at least part of the first equilibrated synthesis gas to remove impurities and generate a first fine synthesis gas; and subjecting at least part of the first fine synthesis gas to conversion process reaction conditions effective to produce a useful product;

selecting for a second period of time a second carbonaceous feedstock material derived from waste materials and/or biomass, the second carbonaceous feedstock being different in its compositional characteristics from the first carbonaceous feedstock;

gasifying in the gasification zone at least part of the second carbonaceous feedstock material to produce a second raw synthesis gas having a second raw synthesis gas $H_2:CO$ ratio;

partially oxidising in the partial oxidation zone at least part of the second raw synthesis gas to produce a second equilibrated synthesis gas having a second equilibrated synthesis gas $H_2:CO$ ratio also controlled to be below the usage $H_2:CO$ ratio of the conversion process;

treating at least part of the second equilibrated synthesis gas to remove impurities and generate a second fine synthesis gas;

and subjecting at least part of the second fine synthesis gas to conversion process reaction conditions effective to produce a useful product;

wherein the second raw synthesis gas $H_2:CO$ ratio is different from the first raw synthesis gas $H_2:CO$ ratio by a percentage ±x and wherein the second equilibrated synthesis gas $H_2:CO$ ratio is the same as the first equilibrated synthesis gas $H_2:CO$ ratio or different from the first equilibrated synthesis gas $H_2:CO$ ratio by a percentage ±y, y being a lower percentage than x.

Typically x is a percentage in the range of from about 1 to about 300.

Typically y is a percentage in the range of from 0 to about 20.

In the process of the invention y is preferably considerably lower than x, for example at least about 10% lower, preferably at least about 25% lower, more preferably at least about 40% lower and most preferably at least about 50% lower.

The process may comprise adjusting the $H_2:CO$ ratio of at least part of the first equilibrated synthesis gas to generate an adjusted first equilibrated synthesis gas having an adjusted $H_2:CO$ ratio.

The process may comprise adjusting the $H_2:CO$ ratio of at least part of the first fine synthesis gas to generate an adjusted first fine synthesis gas having an adjusted $H_2:CO$ ratio.

The process may comprise adjusting the $H_2:CO$ ratio of at least part of the second equilibrated synthesis gas to generate an adjusted second equilibrated synthesis gas having an adjusted $H_2:CO$ ratio.

The process may comprise adjusting the $H_2:CO$ ratio of at least part of the second fine synthesis gas to generate an adjusted second fine synthesis gas having an adjusted $H_2:CO$ ratio.

The process of the invention is therefore concerned with the practicality of generating consistently and efficiently useful products from variable carbonaceous feedstocks. For example, the feedstock can vary between biomass and waste. Even within the waste feedstock, material composition can vary significantly with regards to the amount of plastics, papers, food waste from batch to batch as well as seasonally. In a chemical process plant handling mixed feedstock streams derived from waste and/or biomass there is inherent and significant variability in the nature of the feedstock, in particular as regards the $H_2:CO$ ratio evident in a raw synthesis gas generated from such feedstocks following gasification. Downstream processing of such raw synthesis gas is freighted with difficulty because of the variable nature of such gas arising from different feedstocks at different times in the production cycle. Wide variation in the raw synthesis gas $H_2:CO$ ratio creates problems in consistently and efficiently adjusting that ratio for suitability with the selected downstream reaction train. This is particularly the case when the variability of feedstock is such as to give rise from time to time to $H_2:CO$ ratios which are above the preferred usage ratio of the downstream reaction. In that case the adjustment of $H_2$:CO ratio to generate fine synthesis gas must be made downwardly, necessitating plant components effective for removing $H_2$ from the raw synthesis gas by means of, for example, membrane separation unit as opposed to adding it (to increase the usage ratio) by means of, for example, the water gas shift reaction.

Accordingly, by "different in its compositional characteristics" we mean that the compositional variation between the first and second carbonaceous feedstocks may be considerable over time—as between, for example, different types of commercial or industrial waste or between different types of biomass, or even changing from biomass to commercial or industrial waste or a combination of both feedstocks—with varying ratio of the two components.

The first and second fine synthesis gas $H_2$:CO ratios are below the usage ratio in the process of the invention. Any optional adjustment of at least part of the first and/or second fine synthesis gas $H_2$:CO ratios may be effective to increase the $H_2$:CO ratio in the first and/or second fine synthesis gas to a level at, above or nearer to the usage ratio. It is generally preferred that any such adjustment should raise the $H_2$:CO ratio to a level at or nearer to the usage ratio. However, the usage ratio can be exceeded if desired or acceptable, the main point being that any optional adjustment of the first and/or second fine synthesis gas $H_2$:CO ratios need only be effective to raise the $H_2$:CO ratio, not to lower it.

Consequently, when the reaction conditions effective to produce a useful product include a desired ratio of $H_2$:CO in the feed it is required in accordance with the invention that the equilibrated synthesis gas $H_2$:CO ratio serving as feed to the reaction be below the typical usage ratio for the reaction before any optional adjustment.

By "in the feed" is meant the feed to the reaction train which generates the useful product—i.e. the first and/or second fine synthesis gas entering the reaction train, the $H_2$:CO ratio of which may be optionally adjusted in an upwards direction to be at or nearer to the required usage ratio prior to passage into the reaction train.

In the process of the invention partial oxidation of the raw synthesis gas is effectively used to equilibrate the $H_2$:CO ratio to a large extent even with respect to widely varying $H_2$:CO ratios in the raw synthesis gas arising from different feedstocks coming into the plant during an operating cycle.

Accordingly, the invention also provides a process for the manufacture of a useful product from carbonaceous feedstock of fluctuating compositional characteristics, the process comprising the steps of:

continuously providing the carbonaceous feedstock of fluctuating compositional characteristics to a gasification zone;

gasifying the carbonaceous feedstock in the gasification zone to obtain raw synthesis gas;

recovering at least part of the raw synthesis gas from the gasification zone and supplying at least part of the recovered raw synthesis gas to a partial oxidation zone;

equilibrating the $H_2$:CO ratio of the raw synthesis gas in the partial oxidation zone to obtain equilibrated synthesis gas;

recovering at least part of the equilibrated synthesis gas from the partial oxidation zone;

optionally adjusting the $H_2$:CO ratio of at least part of the equilibrated synthesis gas to obtain adjusted equilibrated synthesis gas;

treating the optionally adjusted equilibrated synthesis gas to remove impurities and generate a fine synthesis gas;

optionally adjusting the $H_2$:CO ratio of at least part of the fine synthesis gas to obtain adjusted fine synthesis gas; and converting the optionally adjusted fine synthesis gas into the useful product in a further chemical reaction with a particular usage ratio;

wherein the fine synthesis gas $H_2$:CO ratio is below the usage ratio and wherein any optional adjustment of at least part of the fine synthesis gas $H_2$:CO ratio is effective only to increase the $H_2$:CO ratio in the fine synthesis gas to a level at, nearer to or above the usage ratio;

wherein the $H_2$:CO ratio of the raw synthesis gas fluctuates during operation of the process as a result of the fluctuating compositional characteristics of the carbonaceous feedstock by a percentage of ±x; and the $H_2$:CO ratio of the equilibrated synthesis gas does not fluctuate during operation of the process or fluctuates during operation of the process as a result of the fluctuating compositional characteristics of the carbonaceous feedstock by a percentage ±y, y being a lower percentage than x.

The further chemical reaction for converting the optionally adjusted fine synthesis gas into the useful product requires a desired feed ratio of $H_2$:CO and the equilibrated synthesis gas $H_2$:CO ratio may be consistently below that desired feed ratio.

The useful product produced in the further chemical reaction by conversion of the optionally adjusted fine synthesis gas corresponds to a certain $H_2$:CO usage ratio and the equilibrated synthesis gas $H_2$:CO ratio may be consistently below that usage ratio.

The useful product produced in the further chemical reaction by conversion of the optionally adjusted fine synthesis gas corresponds to a certain $H_2$:CO usage ratio and the $H_2$:CO ratio in the optionally adjusted fine synthesis gas may be consistently at or no more than 20% above or below that usage ratio.

As above, typically x is a percentage in the range of from about 1 to 300 and y is typically a percentage in the range of from 0 to about 20. Also, as above, y is preferably considerably lower than x, for example at least about 10% lower, preferably at least about 25% lower, more preferably at least about 40% lower and most preferably at least about 50% lower.

Preferably the process of the invention is a continuous process wherein carbonaceous feedstock, of whatever nature provided it is derived from waste materials and/or biomass, is continuously fed to a gasification zone for gasifying the feedstock. The process of the invention is effective to equilibrate the $H_2$:CO ratio in the raw synthesis gas regardless of the compositional makeup of the carbonaceous feedstock.

DETAILED DESCRIPTION

The terms "raw synthesis gas", "equilibrated synthesis gas", "fine synthesis gas", "shifted synthesis gas" and any other phrase containing the term "synthesis gas" are to be construed to mean a gas primarily comprising hydrogen and carbon monoxide. Other components such as carbon dioxide, nitrogen, argon, water, methane, tars, acid gases, higher molecular weight hydrocarbons, oils, tars, volatile metals, char, phosphorus, halides and ash may also be present. The concentration of contaminants and impurities present will be dependent on the stage of the process and carbonaceous feedstock source. In particular, the concentration of contaminants and impurities in the fine synthesis gas is lower, typically very considerably lower, than that in raw or equilibrated synthesis gas as the step of recovering at least part of the equilibrated synthesis gas from the partial oxidation zone and treating the gas to remove impurities and generate a fine synthesis gas (i.e. clean-up step(s)) have yet to be performed at the stages of the inventive process at which both the raw synthesis gas and the equilibrated synthesis gas are generated.

The use of such terms to describe synthesis gas should not be taken as limiting. The skilled person would understand that each of the terms is construed to mean a gas primarily comprising hydrogen and carbon monoxide.

The carbonaceous feedstock may comprise at least one of woody biomass, municipal solid waste and/or commercial and industrial waste. The carbonaceous feedstock will have fluctuating compositional characteristics that are dependent on the source and chemistry of the feedstock used.

The carbonaceous feedstock may be in the form of relatively large pieces. The carbonaceous feedstock may be processed to remove oversized items, recyclates, highly halogenous plastics such as PVC, metals and inert items. These items cannot be converted into synthesis gas and/or are likely to a significant contaminant load (for example, the case of highly halogeneous plastics); therefore it is preferable to remove said items prior to gasification. These items may be recycled.

The carbonaceous feedstock may be reduced to a size suitable for gasification. For example, the carbonaceous feedstock may be comminuted, shredded or chipped prior to gasification.

In some embodiments, the carbonaceous material feedstock is biomass, for example woody biomass feedstock. Example of suitable woody feedstock may include tree length round wood, pulpwood thinnings, whole tree, limbs, branches, tops and/or waste wood.

In one embodiment, round wood is supplied to the plant as logs measuring 5" to 9" diameter x 15' long. In another embodiment, wood chips are supplied to the plant as 6-inch minus chips.

A shredder may be used to reduce the carbonaceous material to a suitable size for the gasification zone. The shredder may reduce the size of the carbonaceous material to particles of about 25 mm. At least about 85%, at least about 90%, at least about 95% by weight of the carbonaceous material may be about 1 $in^3$ or less in volume; depending on the requirements of the gasification technology deployed.

In another embodiment, the carbonaceous feedstock is waste material, for example municipal solid waste and/or commercial and industrial waste.

The carbonaceous feedstock may comprise moisture. Preferably in that case, the carbonaceous feedstock is dried to at least some extent prior to gasification.

The carbonaceous feedstock may be conveyed to a dryer to reduce the moisture content to a suitable level. The moisture content may be reduced to less than about 20%, less than about 15% or less than about 10% by weight. Preferably, the carbonaceous feedstock supplied to the gasification zone has a moisture content of at most 10% by weight; depending on the requirements of the gasification technology deployed.

When waste material (as mentioned above) is used as the carbonaceous feedstock source, the feedstock may not need drying prior to entering the gasification zone. Waste material in this case may be fed directly into the gasifier after suitable pre-treatment to remove undesirable components and comminute the feedstock to a size suitable for feedstock handling.

The carbonaceous feedstock may be continuously fed into a gasification zone.

The process of the invention obtains raw synthesis gas through gasifying the carbonaceous feedstock in a gasification zone. Gasification may occur in the presence of steam and oxygen. The gasification zone may comprise a singular train, dual trains or multiple trains. Preferably, the gasification zone comprises more than one train to minimize impact of interruptions on the plant availability.

Three primary types of commercially available gasifiers are of fixed/moving bed, entrained flow, or fluidized bed type. The gasification zone may be an indirect gasification zone in which feedstock and steam are supplied to a gasification vessel which is indirectly heated. Alternatively, the gasification zone may be a direct gasification zone in which feedstock, steam and an oxygen-containing gas are supplied to the gasification vessel and directly combusted to provide the necessary heat for gasification. Also known in the art and suitable for use in the process of the present invention are hybrid gasifiers, and gasifiers incorporating partial oxidation units. In that case it will be understood that in the process of the invention the gasification zone and the partial oxidation zone may be separate zones of a single vessel.

In one embodiment, the gasification zone comprises primarily an indirectly heated deep fluidized bed operating in the dry ash rejection mode and a secondary gasifier for maximal conversion of the carbonaceous material. In another embodiment, the gasification zone may comprise only a primary indirectly heated fluidized bed.

The fluidised bed operating temperature may vary depending on the compositional characteristics of the carbonaceous feedstock. The fluidised bed operating temperature may be between about 400 and 1000° C., preferably between about 500 and 900° C., or more preferably between about 600 to 800° C.

Such temperature ranges of the fluidised bed have been found to avoid any constituent ash from softening and forming clinkers with the bed material.

The fluidized bed reactor may be preloaded with a quantity of inert bed media such as silica sand or alumina. The inert bed media may be fluidized with superheated steam and oxygen. The superheated steam and oxygen may be introduced through separate pipe nozzles.

During gasification, the fluidized bed may undergo drying (or dehydration), devolatilization (or pyrolysis) and gasification. Some combustion, water gas shift and methanation reactions may also occur.

It is desirable to have a pressure within the gasification zone that minimises the need of compression in downstream processes. It is therefore preferable for the gasification zone to have a pressure of at least about 3.5 bar if not higher, for example about 4 bar or more. Gasification zones operating at even much higher pressures such as 10 bar or more are known in the art. Similarly, gasification zones operating at lower pressures, for example about 1.5 bar or less are also known in the art. All are suitable for use in the process of the present invention.

The raw synthesis gas leaving the gasification zone may have an exit temperature of at least about 600° C., of at least about 700° C., or of at least about 800° C. Preferably, the raw synthesis gas leaving the gasification zone has an exit temperature of from about 700° C. to about 750° C.

The major products leaving the gasification zone are typically steam and raw synthesis gas comprised of hydrogen and carbon monoxide (CO) (the essential components of synthesis gas), carbon dioxide ($CO_2$), methane, and small amounts of nitrogen and argon. There may be additional tars such as benzene, toluene, ethyl benzene and xylene, higher hydrocarbons, waxes, oils, ash, soot, bed media components and other impurities present.

Carbon dioxide, sulphur, slag and other by-products and impurities of gasification may be amenable to capture, collection and reuse.

Cyclones may be used to remove undesirable solid materials from the raw synthesis gas.

A tramp discharge system may be used to remove heavier contaminants from the bed material in operation of the gasification process.

Depending on the source of the feedstock used, the ratio of main components and impurities present in the synthesis gas may vary, and the hydrogen to carbon monoxide ratio of the raw synthesis gas can vary substantially. In particular, there will be greater fluctuation in the hydrogen to carbon monoxide ratio of the raw synthesis gas when waste feedstock is used as the feedstock source due to the swings in compositional chemistry and variable moisture present. Biomass derived feedstocks can also vary according to type. For example, the gas composition for Rice husk vs pine wood vs eucalyptus vs nut shells can result in varying hydrogen to carbon monoxide ratios in the raw syngas (see Taherzadeh, Mohammad & Chandolias, Konstantinos & Richards, Tobias. (2018). *Combined Gasification-Fermentation Process in Waste Biorefinery.* 10.1016/B978-0-444-63992-9.00005-7).

The hydrogen to carbon monoxide ratio in the feed and/or term "feed ratio" is to be construed as the volume of hydrogen per volume of carbon monoxide in the relevant feed stream.

The hydrogen to carbon monoxide usage ratio and/or term "usage ratio" is to be construed as the volume of hydrogen consumed in the reaction per volume of carbon monoxide used in the further conversion process or chemical reaction (as mentioned in the statements of invention above) to produce a useful product.

The presence of impurities can influence the processing conditions of downstream processes and further steps may be required to remove any impurities present. It is desirable to control the fluctuation of the hydrogen to carbon monoxide ratio in the raw synthesis gas according to the invention to improve the overall performance, product yield and optimisation when compared to conventional methods. The inventors have found that controlling the hydrogen to carbon monoxide ratio fluctuation in the feed (raw synthesis gas) obviates the need to include additional steps downstream to optimise the process and remove impurities, which is desirable.

Depending on the source of carbonaceous feedstock and the gasification technology, the raw synthesis gas may comprise between about 3 and 40% carbon dioxide, in addition to other impurities and contaminants.

In order to obtain high-quality gas that is required for its use as a feedstock in downstream processes such as synthesis, the impurities need to be removed. Non-limiting examples of suitable synthesis include Fischer-Tropsch (FT) synthesis, ammonia synthesis and methanol synthesis.

The hydrogen to carbon monoxide ratio of raw synthesis gas leaving the gasification zone may not be optimal for downstream synthesis reactions. Different synthesis reactions require different specific hydrogen to carbon monoxide feed ratios; therefore, it is desirable to influence the hydrogen to carbon monoxide feed ratio to obtain maximal efficiencies and yield.

As a non-limiting example, it is desirable to increase the hydrogen to carbon monoxide ratio of the raw synthesis gas when the downstream synthesis process is the Fischer-Tropsch reaction if it is significantly lower than the usage ratio.

The raw synthesis gas leaving the gasification zone may comprise a sulphur concentration of less than about 500 ppm, less than about 400 ppm, less than about 300 ppm, less than about 200 ppm. Preferably, the raw synthesis gas comprises a sulphur concentration of less than about 200 ppm.

The concentration of sulphur in the raw synthesis gas will influence the process conditions that are employed downstream.

At least part of the raw synthesis gas from the gasification zone is recovered and at least part of the recovered raw synthesis gas is supplied to a partial oxidation zone. The raw synthesis gas in the partial oxidation zone will undergo partial oxidation reactions.

Conventional partial oxidation zones in the art are typically catalytic or non-catalytic (thermal).

The partial oxidation zone may partially combust tail gas from a downstream synthesis unit and/or natural gas with preheated oxygen and/or steam. The partial oxidation zone may comprise a burner to produce a stream of hot oxygen.

The partial oxidation zone is effective sufficiently to raise the temperature of the raw synthesis gas to convert at least some of any tars, naphthalene, higher hydrocarbons and methane present into carbon oxides, hydrogen and water.

The partial oxidation zone may operate at a temperature of least about 1100° C., at least about 1200° C., at least about 1300° C. Preferably, the partial oxidation zone operating temperature is at least about 1300° C., most preferably in the range of from about 1200° C. to about 1350° C.

The partial oxidation zone may convert residual methane, naphthalene, higher hydrocarbons and tar components into carbon oxides, hydrogen and water. Synthesis gas leaving the partial oxidation zone may be construed to be equilibrated synthesis gas.

The equilibrated synthesis gas leaving the partial oxidation zone will be hot and may be cooled by generating steam. Generation of superheated steam and/or saturated high pressure steam is preferable to improve process efficiency. The cooled equilibrated synthesis gas may be passed through a venturi scrubber to remove any water and particulates such as ash and soot. A caustic wash may be additionally used to remove any other impurities such as ammonia, halides, nitrous oxides and remaining particulates.

The partial oxidation zone may operate at a pressure slightly or somewhat lower than that of the gasification zone (to avoid any intermediate compression requirements). The partial oxidation zone may operate at a pressure of between about 2 and 3 bar for a gasification process that operates around 3.5 bar, for example.

The inventors have surprisingly found the inclusion of a partial oxidation zone within the process according to the invention offers flexibility and gives the gasification zone the ability to the handle of a wide range of feedstock with fluctuating compositional characteristics. The inventors have unexpectedly found that the use of a partial oxidation zone is able to equilibrate the hydrogen to carbon monoxide ratio of the raw synthesis gas in a fixed direction below the usage ratio, prior to optionally further adjusting the ratio with a single or straightforward process step, for example, a water gas shift reaction downstream of the partial oxidation zone but upstream of the reaction to generate a useful product or by adding hydrogen from other sources.

The inventors have unexpectedly found that the use of a partial oxidation zone according to the invention can equilibrate the hydrogen to carbon monoxide ratio in raw synthesis gas obtained from gasification of a wide variety of sources of carbonaceous feedstock to obtain a more consistent value below the usage ratio of the selected downstream reaction to form a useful product. The partial oxidation zone has been found to equilibrate the $H_2$:CO ratio of the raw synthesis gas entering the partial oxidation zone to a fixed range below the usage ratio, regardless of the source of carbonaceous feedstock used. This is particularly advantageous when waste and/or biomass feedstocks are used due to the greater variability in chemical composition compared to conventional feedstocks, leading to a greater fluctuation in $H_2$:CO ratio of the raw synthesis gas.

For specific synthesis reactions, the $H_2$:CO ratio in the feed to the chemical reactor in which the synthesis takes place is required to be in within a desired range, typically lower than the usage ratio. The usage ratio is dependent on the synthesis reaction conditions and the desired product make.

As a non-limiting example, when a Fisher-Tropsch reaction is employed as the reaction for generating a useful product, a ratio of $H_2$:CO in the optionally adjusted fine synthesis gas is significantly above the usage ratio will cause the reaction to run at an increased rate, which is undesirable as the increased rate of reaction may subsequently lead to an uncontrolled reaction resulting in a thermal runaway situation.

Alternatively, if the $H_2$:CO ratio in the optionally adjusted fine synthesis gas is significantly below the usage ratio, there is a likelihood of depletion of hydrogen towards the exit of the catalyst bed in the reaction zone in which the reaction to obtain a useful product takes place, resulting in accelerated deactivation accompanied by potential deposition of carbonaceous species, which is undesirable.

It is, therefore, highly important that the $H_2$:CO ratio in the optionally adjusted fine synthesis gas be in a desired range, below or at or above, but not significantly above or below, the usage ratio. By "not significantly" is meant not more than 20%.

Depending on the feedstock and the variation in feedstock composition, the $H_2$:CO ratio in the raw synthesis gas (recovered from gasification zone) can be either below or above this desired range (and usage ratio). The processing steps needed to bring this hydrogen to carbon monoxide ratio in the desired range vary significantly with the direction of the deviation. For cases where the $H_2$:CO ratio in the raw synthesis gas is below the desired range—a water gas shift reactor can be employed to increase the hydrogen content of the stream. However, for the case where the $H_2$:CO ratio in raw synthesis gas is above the desired range—a hydrogen removal step such as using a membrane or pressure swing adsorption would have to be deployed. Given that these processing steps are very different and require separate equipment, having a ratio of $H_2$:CO in the raw synthesis gas in a single direction relative to the desired range can result in significant operational flexibility and reduced capital costs in constructing plant to implement the process of the invention. For example, with seasonal or source based waste compositional changes or a switch from biomass to waste as feedstock, the resulting $H_2$:CO ratio in the raw synthesis gas can change from below desired range to above the desired range and it would then be necessary to alternate from one set of reaction equipment to another (as described above). This would increase operational complexity and would require both sets of equipment to be installed and configured to accept feed gas, which would add significant complexity to the plant and also necessitate additional expenditure in terms of the capital cost of laying down the plant.

However, with the inclusion of the equilibration step afforded by the partial oxidation zone in the process of the invention, the $H_2$:CO ratio in the equilibrated synthesis gas is forced to be below the desired range (and the usage ratio). Thus, the facility now needs only one set of equipment (for example, the water gas shift reactor mentioned above) in order to adjust the $H_2$:CO ratio in the equilibrated synthesis gas to the correct desired range in the optionally adjusted fine synthesis gas.

The partial oxidation zone may also make the handling and removal of nitrogen, sulphur and phosphorus species easier. By way of non-limiting examples, the organic sulphur species may form COS and $H_2S$, the organic nitrogen species may form HCN and the phosphorus species may form $P_2O_5$ which are easier to remove compared to their organic counterparts.

The partial oxidation zone may melt any ash present to form a slag. The slag may be collected via a slag bath.

With the inventive process the following equipment may be selected for the further processing of the equilibrated synthesis gas.

The equilibrated synthesis gas may be compressed. The compression of synthesis gas may occur after the synthesis gas has left the partial oxidation zone and has been cooled.

At least a part of the equilibrated synthesis gas from the partial oxidation zone may be passed through a Water Gas Shift (WGS) unit to obtain shifted synthesis gas and blended with the remaining equilibrated synthesis gas to adjust the hydrogen to carbon monoxide ratio to the desired range.

The term "water gas shift reaction" or "WGS" is to be construed as a thermochemical process comprising converting carbon monoxide and water into hydrogen and carbon dioxide. The synthesis gas obtained after the WGS reaction may be construed to be shifted (i.e. adjusted) synthesis gas.

The presence of sulphur compounds is important when considering the choice of WGS catalyst for the WGS reaction. Sulphur may be removed from the feed prior to WGS process or a sulphur tolerant WGS catalyst can be used (sour shift catalyst). Preferably, sulphur is removed from the feed prior to the WGS process.

In one embodiment, the synthesis gas entering the WGS unit is essentially a low sulphur gas (<0.1 ppmv) to enable a sweet shift. The synthesis gas entering the WGS unit may be equilibrated synthesis gas.

The process according to the present invention may further comprise sequentially removing ammoniacal, sulphurous and carbon dioxide impurities from the raw synthesis gas.

The process of sequentially removing ammoniacal, sulphurous and carbon dioxide impurities from the raw synthesis gas and recovering carbon dioxide may occur prior to the WGS reaction. The resulting synthesis gas may be construed to be desulphurised synthesis gas.

The removal of ammoniacal, sulphurous and carbon dioxide impurities may be a physical or chemical absorption process.

In accordance with the present invention, sulphur may be removed in upstream processes. The equilibrated gas supplied to the water gas shift unit is essentially a low sulphur gas.

The water gas shift reaction may use a sweet shift catalyst. The sweet shift catalyst may be a metal sulphide catalyst.

The physical absorption process may be a Rectisol™ process, a Selexol™ process, or any similar solvent based physical absorption process.

In one embodiment, the physical absorption unit may be configured to operate a dual stage process with two separate absorber columns that contact the synthesis gas stream with methanol comprising a common methanol regeneration system. The first absorber column may selectively remove sulphur and may use a $CO_2$ saturated solvent to minimise $CO_2$ absorption in the sulphur removal column. The second absorber column may recover $CO_2$.

This technology is further described elsewhere; for example in *Fossil Fuel Emissions Control Technologies*, Bruce Miller, 2015.

Carbon dioxide may be recovered in substantially pure form. The recovery of $CO_2$ may follow the WGS reaction.

The inventors have found that the use of a WGS reaction according to the invention is able to adjust the hydrogen to carbon monoxide ratio of the synthesis gas entering the WGS unit to a desired ratio (below the usage ratio) according to the intended reaction.

The synthesis gas has already been equilibrated in the partial oxidation zone prior to entering the WGS shift unit; therefore the fluctuation of the hydrogen to carbon monoxide ratio in the synthesis gas has already been substantially reduced. The resulting shifted synthesis gas optionally blended with the remainder of the equilibrated synthesis gas (forming the optionally adjusted fine synthesis gas) therefore obtains a desired hydrogen to carbon monoxide ratio specific to the intended synthesis, with an even reduced fluctuation.

The WGS reaction converts carbon monoxide and water into hydrogen and carbon dioxide in the presence of (high pressure superheated) steam.

At least a portion of the equilibrated synthesis gas and/or raw synthesis gas may be bypassed without subjecting said synthesis gas to a WGS reaction, thereafter, combining said shifted and bypassed gas into optimal proportions to obtain the desired hydrogen to carbon monoxide feed ratio in the optionally adjusted fine synthesis gas. The proportion of gas bypassed will vary depending on the desired ratio of the synthesis reaction downstream and the severity of the shift reaction. Controlling the proportion of bypassed gas sent to the reactors helps in obtaining specific hydrogen to carbon monoxide feed ratios.

As a non-limiting example, it is desirable to increase the hydrogen to carbon monoxide ratio of the equilibrated synthesis gas when wanting to supply optionally adjusted fine synthesis gas to a Fisher-Tropsch reactor.

The optionally adjusted fine synthesis gas has a hydrogen to carbon monoxide ratio of 2.00±10%, preferably ±5%, ±2%, ±1%, ±0.5%, ±0.1%, or ±0.05%.

Hydrogen may be recovered from the shifted synthesis gas downstream of the water gas shift reaction.

At least a portion of the shifted synthesis gas may be sent to a Hydrogen Recovery Unit (HRU). The HRU may utilize a Pressure Swing Adsorption (PSA) process to produce high purity hydrogen for different uses. The high purity hydrogen may be used in upstream and/or downstream processes. However, because of the equilibratory effect of the POx zone in the process of the invention, the installed size of this unit is significantly smaller compared to that required for removal of hydrogen from the raw synthesis gas stream in order to adjust the $H_2$:CO ratio to the desired range for the further chemical reaction. The offgas from HRU may be used as a fuel gas to reach required combustion temperatures in the incinerators. It may be noted that in the process of the invention any HRU which is present may be utilised to generate hydrogen for various uses, either off- or on-plant, but it is not necessary to configure the plant to remove hydrogen from any synthesis gas for the purpose, or solely for the purpose, of reducing the $H_2$:CO ratio in the synthesis gas as it progresses downstream into a chemical reactor for generating a useful product, as explained above.

The high purity hydrogen from the HRU may be about at least 97%, at least about 98%, and least about 99% pure, at pressure. Impurities that are removed may include, but are not limited to, CO, $CO_2$, $CH_4$, $N_2$ and Ar.

The upstream and/or downstream processes utilizing the recovered hydrogen may include removal of at least one of the ammoniacal, or sulphurous or carbon dioxide impurities, catalyst regeneration of synthesis reactors and product upgrading.

The shifted synthesis gas from the WGS unit combined with bypassed synthesis gas may pass through an inlet filtration system, for example an inlet guard bed, prior to the synthesis unit. The inlet guard bed may be a sulphur guard bed. The inlet guard bed may operate in a lead-lag configuration to remove residual traces of contaminants such as hydrogen sulphide, phosphorus, COS, arsenic, chlorides and mercury from the synthesis gas. The lead bed may remove any contaminants present and the lag may serve as a safeguard for when the lead bed breaks through.

The synthesis gas leaving the guard bed may be construed as optionally adjusted fine synthesis gas.

Optionally adjusted fine synthesis gas may be converted into a useful product.

The useful product may comprise liquid hydrocarbons. The liquid hydrocarbons may be sustainable liquid transportation fuels.

The useful product may be produced by subjecting at least part of the optionally adjusted fine synthesis gas to a Fischer-Tropsch synthesis unit.

At least a portion of the synthesis gas may be fed into a synthesis unit. Non-limiting examples of suitable synthesis include Fischer-Tropsch, ammonia synthesis, methanol synthesis or alcohol synthesis.

Synthesis reactions require specific hydrogen to carbon monoxide ratio in feed gas ("desired ratio") for optimum performance to meet process requirements, maximise conversion and product yield. As a non-limiting example, the Fischer-Tropsch synthesis feed may have a hydrogen to carbon monoxide ratio of about 2. This desired ratio is typically lower than the usage ratio. As a non-limiting example, the Fischer-Tropsch synthesis usage ratio may be in the 2.04-2.14 range, typically about 2.1.

According to the embodiment relating to Fischer-Tropsch synthesis, the optionally adjusted fine synthesis gas may be fed into a FT reactor.

The synthesis unit may be a FT unit comprising FT reactors. The FT reactors may comprise microchannels. Filters may be used to remove any particulates.

The FT reactor may convert at least part of the carbon monoxide and hydrogen of the optionally adjusted fine synthesis gas into mainly linear hydrocarbons.

The Fischer-Tropsch synthesis unit may convert the optionally adjusted fine synthesis gas into liquid hydrocarbons.

The conversion of synthesis gas into liquid hydrocarbons is conducted in the presence of a catalyst. The chain length distribution will be dependent on the properties of the catalyst used and the operating conditions.

Fischer-Tropsch reactions are exothermic and release heat that must be removed to keep the temperature of the reaction approximately constant. Localised high temperatures in the catalyst bed have been found to adversely affect the FT product mix, yield and potentially reduce catalyst life. Therefore, it is desirable to keep the temperature constant.

The temperature may be controlled by varying pressure of a steam drum associated with the FT reactor used in conjunction with circulating cooling water.

The operating temperature for the FT synthesis may be between about 125 and 350° C., between about 150 and 300° C., between about 170 and 250° C., between about 180 and 240° C. Preferably, the operating temperature is between about 180 and 240° C. for a low temperature FT technology.

The catalyst may be a metal or compounded metal catalyst with a support. In one embodiment, the metal is cobalt. The support may be made from silica and/or titania.

The products that may be obtained in the FT synthesis, for example, said hydrocarbons, may include heavy FT liquid (HFTL), light FT liquid (LFTL), FT process water, naphtha, and tail gas comprising of inerts as well as uncondensed light hydrocarbons, typically C1 to C4. A part of the tail gas comprising of light hydrocarbons, C1 to C4 range, may be recycled back to the partial oxidation zone or sent to a fuel gas system.

A part of the tail gas stream may be combined with the fresh synthesis gas prior to being fed to the FT reactors to maximize the utilization of CO available in the synthesis gas. In such instances, A purge stream may be used to prevent build-up of inert gases, such as $CO_2$ and $CH_4$, that are produced in the FT reactors. The use of tail gas stream as a fuel described above would qualify as a purge stream as the gases leave the process loop.

It is desirable to upgrade the liquid hydrocarbons into a further useful product.

The liquid hydrocarbons may be upgraded to make a further useful product. At least part of the liquid hydrocarbons may be upgraded by at least one of hydroprocessing, hydrotreating, product fractionation, hydrocracking and/or hydroisomerisation.

The FT liquid upgrading unit may produce high quality naphtha and Synthetic Paraffinic Kerosene (SPK). Other upgraded products may include gasoline, diesel and waxes. The unit may be configured as a recycle hydrocracker.

The further useful product may be a sustainable liquid transportation fuel or a gasoline blendstock. The transportation fuel or gasoline blendstock may be used for aviation and/or vehicles. The sustainable liquid transportation fuel may comprise high quality SPK. The gasoline blendstock may comprise naphtha.

The products formed by a process according to the present invention may constitute cleaner versions of fuels formed by conventional processes.

The fuel produced according to the present invention may improve air quality, with up to 90% reduction in particulate matter (soot) from aircraft engine exhausts and almost 100% reduction in sulphur oxides.

The invention also provides a useful product produced by a process as disclosed herein.

The invention also provides a process for the manufacture of a predetermined hydrocarbon product from a carbonaceous feedstock feed of fluctuating composition, the process having a target usage ratio of $H_2$:CO associated with the production of said predetermined hydrocarbon product, the process comprising:

a) gasifying the carbonaceous feedstock in a gasification zone to obtain raw synthesis gas having a percentage fluctuation ±x in its $H_2$:CO ratio;
b) equilibrating the raw synthesis gas to generate equilibrated synthesis gas in an equilibration zone in which the $H_2$:CO ratio is adjusted towards said target ratio, the equilibrated synthesis gas having a percentage fluctuation ±y in its $H_2$:CO ratio wherein y<x,
c) treating the equilibrated synthesis gas to remove impurities and generate a fine synthesis gas, and
d) converting the fine synthesis gas into the hydrocarbon product.

BRIEF DESCRIPTION OF THE DRAWINGS

Referring to FIG. 1, prior art processes conventionally require different routes for the synthesis gas after gasification, depending on whether the hydrogen to carbon monoxide ratio in the generated raw synthesis gas is higher or lower than the usage ratio for the desired reaction, in order to obtain synthesis gas suitable for the required synthesis, which has been depicted as FT synthesis. Prior art processes are not able to handle varying hydrogen to carbon monoxide ratios in the feed that are on either side of the usage ratio using the same process equipment and therefore require different routes before feeding optionally adjusted fine synthesis gas streams to the FT synthesis unit. Comparing the schematic of FIG. 1 to FIG. 2, the process according to the present invention eliminates several stages that are required in the conventional prior art process, thus simplifying the overall process and provides a process with a reduced number of stages.

The elimination of these stages is made possible due to the presence of a partial oxidation zone which equilibrates the hydrogen to carbon monoxide ratio in the raw synthesis gas leaving the gasification zone to a small window below the usage ratio, independent of the feedstock employed. Therefore, it is not necessary to separate the processing steps based on whether the hydrogen to carbon monoxide ratios in the feed are lower or higher than usage ratios, as in the prior art processes, in order to obtain the desired ratio for an FT reaction. This is because the $H_2$:CO ratio in the equilibrated synthesis gas exiting the partial oxidation zone will be homogenised and always lower than the usage ratio. The process according to the present invention is therefore beneficial in providing a process that offers flexibility in relation to the feedstock used and reduces the need for additional stages downstream. This can be seen in the Examples illustrated below.

Figure 1:
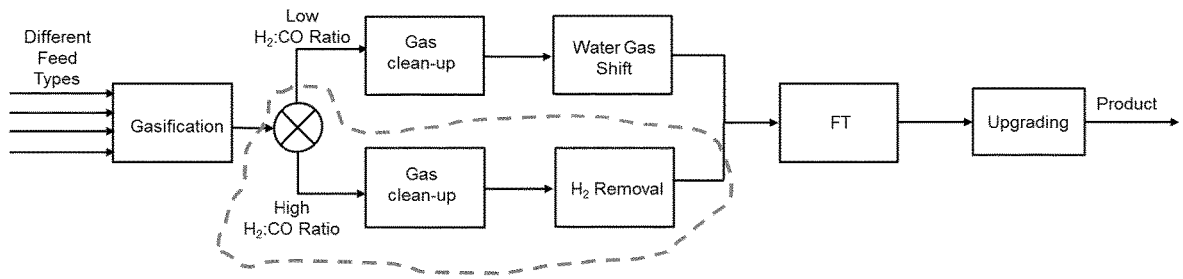
FIG. 1 depicts a schematic diagram of a process applying conventional teaching in the prior art for undertaking FT synthesis from multiple feedstock sources or a feedstock source with variable composition. The section highlighted by the dashed area highlights steps which are not required for the process in accordance with the present invention.
Figure 2:
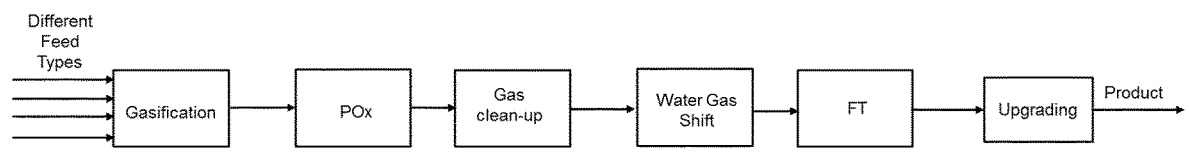
FIG. 2 depicts a schematic diagram of the process according to the present invention.
Figure 3:
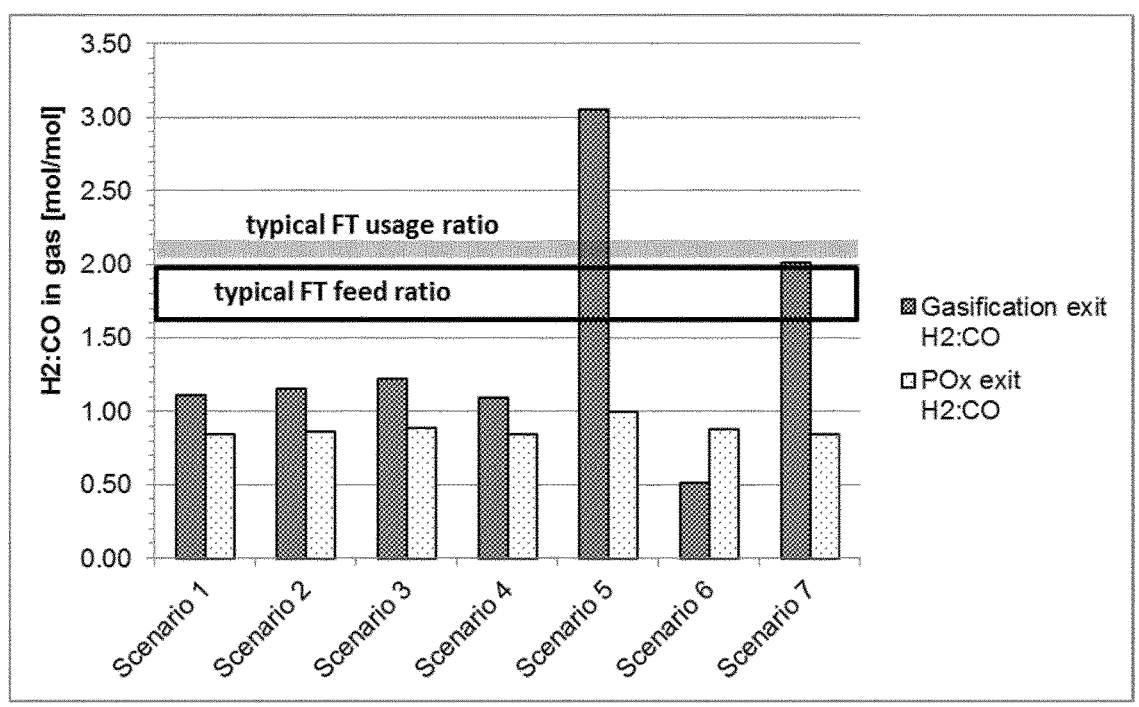

FIG. 3 depicts a graph of the hydrogen to carbon monoxide ratio of the raw synthesis gas exiting the gasification zone and the equilibrated synthesis gas exiting the partial oxidation zone in accordance with the present invention when different feedstock sources are used. FIG. 3 also highlights the typical hydrogen to carbon monoxide ratio of the synthesis gas desired for a FT reaction and the typical usage ratio observed in the FT reaction. The results demonstrate the equilibration of usage ratio upon exiting the partial oxidation zone independent of the source of feedstock.

Figure 4:
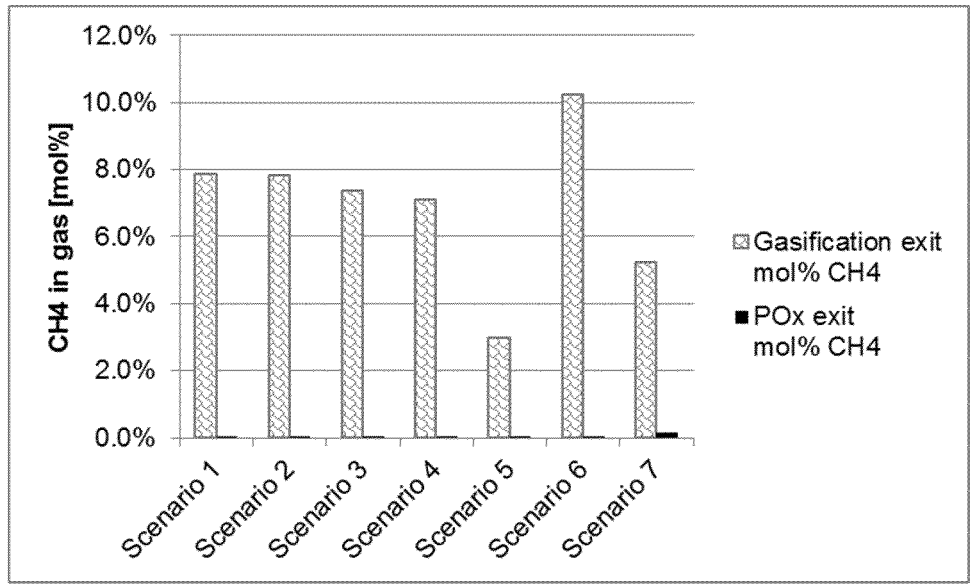

FIG. 4 depicts a graph of the mol % of $CH_4$ present in the synthesis gas exiting the gasification zone and the partial oxidation zone in accordance with the present invention when different feedstock sources are used. The results demonstrate the significant reduction in $CH_4$ present in the synthesis gas exiting the partial oxidation zone in comparison to the gasification zone, indicating that more of the carbon is captured and utilized in the process.

Figure 5:
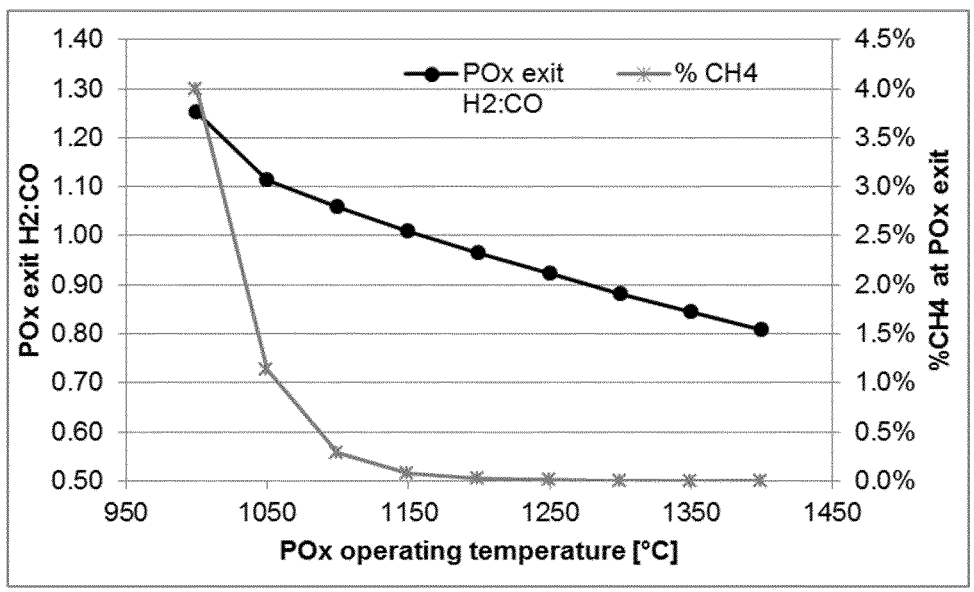

FIG. 5 depicts a graph showing the effect that the partial oxidation operating temperature has on the hydrogen to carbon monoxide ratio and mol % of $CH_4$ in the equilibrated synthesis gas leaving the partial oxidation zone. The partial oxidation zone temperature may be used as a lever to tune the methane slip and the hydrogen to carbon monoxide ratio in the equilibrated synthesis gas.

The invention will now be more specifically described with reference to the following non-limiting examples.

EXAMPLES

Table 1 outlines different sources of feedstock compositions that were used in accordance with the present invention to obtain synthesis gas used for a FT process.

The % moisture content of the feedstock after preliminary feedstock handling and drying is also indicated.

TABLE 1

| | Feedstock Composition/% | | | | | | | |
|---|---|---|---|---|---|---|---|---|
| Ex | Household waste | Commercial waste | Food | Paper | High (40%) plastic content waste | Hardwood | Pine | Moisture content/% |
| 1 | | 100 | | | | | | 10 |
| 2 | 70 | 30 | | | | | | 10 |
| 3 | 70 | 30 | | | | | | 15 |
| 4 | | | 100 | | | | | 10 |
| 5 | | | | 100 | | | | 10 |
| 6 | | | | | 100 | | | 10 |
| 7 | | | | | | 25 | 75 | — |

Examples 1 to 7 are all feedstocks for use in the process of the invention.

Process

Each of Examples 1 to 7 are treated as follows:

The feedstock of each Example is initially processed by the removal of large contra-material, recyclates (e.g. metals, ferrous and non-ferrous) and inerts such as glass, stone and grit. The resulting treated feedstock is then comminuted and dried to a desired moisture content (in this case 10%) to obtain Solid Recovered Fuel (SRF).

The SRF is supplied continuously at a pre-determined rate to a fluidised bed gasification unit operated at a temperature of approximately 700° C., a pressure of approximately 2.2 barg and supplied with superheated steam to effect the gasification and produce a raw synthesis gas having a first $H_2$:CO ratio.

The raw synthesis gas exits the gasifier and is supplied to an oxygen-fired partial oxidation reactor maintained at a temperature above 1250° C. and supplied with all of the raw synthesis gas at generated from the gasification step described above while adjusting the oxygen rate to achieve the target temperature. The partial oxidation reaction converts residual methane and other hydrocarbons into synthesis gas and generates an equilibrated synthesis gas having a second $H_2$:CO ratio.

The resulting hot equilibrated synthesis gas is cooled (by generating superheated and saturated high pressure steam) to a temperature below 200° C. and is then routed through a primary gas cleanup unit where it passes through a venturi scrubber to knock-out water and particulates (such as soot and ash), after which it is caustic-washed to remove ammonia, halides (e.g. HCl), nitrous oxides and any remaining particulates.

The synthesis gas is then compressed and routed through a secondary gas cleanup and compression system in which acid gas ($H_2S$ and $CO_2$) removal is effected by the Rectisol™ process using a methanol solvent which "sweetens" the synthesis gas.

The secondary gas cleanup process includes various guard beds to remove materials such as mercury, arsenic and phosphorus along with additional sulfur polishing beds which serve as (FT) inlet guard beds.

A portion of the synthesis gas stream is passed through a Water Gas Shift (WGS) unit to adjust the hydrogen to carbon monoxide ($H_2$:CO) ratio in the total feedstream (to the desired ratio) as it recombines.

Optionally adjusted fine synthesis gas is sent to the FT microchannel reactors where, in the presence of a cobalt catalyst supported on a silica/titania support, it is converted into synthetic liquid hydrocarbons.

The synthetic FT liquids are hydrocracked, hydroisomerised and then hydrotreated. Subsequently they are fractionated into LPG, naphtha and SPK.

Table 2 shows the usage ratio of the synthesis gas exiting the gasification and the partial oxidation zone (also depicted in FIG. 3).

TABLE 2

| | $H_2$:CO (mol/mol) | |
|---|---|---|
| Ex | Gasification Zone Exit | Partial oxidation Zone Exit |
| 1 | 1.11 | 0.85 |
| 2 | 1.15 | 0.86 |
| 3 | 1.22 | 0.89 |
| 4 | 1.09 | 0.84 |
| 5 | 3.05 | 1.00 |
| 6 | 0.51 | 0.87 |
| 7 | 2.01 | 0.84 |

Table 3 shows the relative percentage variation between each pair of the Examples in the $H_2$:CO ratio at the gasification zone exit, calculate as (column/row-1). Negative numbers indicate a lower $H_2$:CO than one being compared with.

TABLE 3

| Example | 1 | 2 | 3 | 4 | 5 | 6 | 7 |
|---|---|---|---|---|---|---|---|
| 1 | | 4 | 10 | −2 | 175 | −54 | 81 |
| 2 | −3 | | 6 | −5 | 165 | −56 | 75 |
| 3 | −9 | −6 | | −11 | 150 | −58 | 65 |
| 4 | 2 | 6 | 12 | | 180 | −53 | 84 |
| 5 | −64 | −62 | −60 | −64 | | −83 | −34 |
| 6 | 118 | 125 | 139 | 114 | 498 | | 294 |
| 7 | −45 | −43 | −39 | −46 | 52 | −75 | |

Table 4 shows the relative percentage variation between each of the Examples in the $H_2:CO$ ratio at the partial oxidation zone exit, calculate as (column/row-1). Negative numbers indicate a lower $H_2:CO$ than one being compared with.

TABLE 4

| Example | 1 | 2 | 3 | 4 | 5 | 6 | 7 |
|---|---|---|---|---|---|---|---|
| 1 | X | 1.2 | 4.7 | −1.2 | 17.6 | 2.4 | −1.2 |
| 2 | −1.2 | X | 3.5 | −2.3 | 16.3 | 1.2 | −2.3 |
| 3 | −4.5 | −3.4 | X | −5.6 | 12.4 | −2.2 | −5.6 |
| 4 | 1.2 | 2.4 | 6.0 | X | 19 | 3.6 | 0 |
| 5 | −15 | −14 | −11 | −16 | X | −13 | −16 |
| 6 | −2.3 | −1.1 | 2.3 | −3.4 | 14.9 | X | −3.4 |
| 7 | 1.2 | 2.4 | 6.0 | 0 | 19 | 3.6 | X |

It will be seen in comparing each of Tables 3 and 4 that the percentage difference between the $H_2:CO$ ratios of each example compared to each other example is consistently lower and in many cases very substantially lower at the partial oxidation exit than it is at the gasification zone exit.

It can be seen from the results in Tables 3 & 4 above and FIG. 3 that the hydrogen to carbon monoxide ratio of the raw synthesis gas exiting the gasification zone varies substantially depending on the feedstock employed. Different syntheses require specific desired ratios for hydrogen to carbon monoxide in feed. Also illustrated in FIG. 3 are the typical desired $H_2:CO$ feed ratio of the synthesis gas and the usage ratio for a FT reaction.

It can also be seen from the results that the equilibrated synthesis gas leaving the partial oxidation zone has significantly reduced the variability in the hydrogen to carbon monoxide ratio for the different feedstock compositions compared to the hydrogen to carbon monoxide ratios of the raw synthesis gas exiting the gasification zone. Therefore, the use of a partial oxidation zone in accordance with the present invention equilibrates the hydrogen to carbon monoxide ratio of the synthesis gas exiting partial oxidation zone independent of the source of feedstock used and irrespective of the hydrogen to carbon monoxide ratio of the raw synthesis gas exiting the gasification zone (and subsequently entering the partial oxidation zone).

The synthesis gas leaving the partial oxidation zone may be fed into a WGS reactor prior to the FT reaction in accordance with the present invention to obtain a desired ratio for hydrogen to carbon monoxide within the highlighted range consistent with a typical FT feed ratio that is below the usage ratio. The WGS reaction is used to increase the hydrogen to carbon monoxide ratio of the synthesis gas exiting the partial oxidation zone to fall within the typical FT synthesis feed range. Thus, without the partial oxidation zone in the present invention Examples 5 and 7 would not fall within such values and would require alternative treatment to reduce the hydrogen to carbon monoxide ratio.

Table 5 shows the % mol content of $CH_4$ exiting the gasification and partial oxidation zone in accordance with the present invention. As can be seen by the results, there is a significant reduction in the presence of $CH_4$ leaving the partial oxidation zone compared to the gasification zone. The reduction in $CH_4$ impurities is important for increasing the capture and recovery of carbon from the feedstock to the product. The partial oxidation zone converts residual methane into carbon oxides.

TABLE 5

| | $CH_4$ (% mol) | |
|---|---|---|
| Ex | Gasification Zone Exit | partial oxidation Zone Exit |
| 1 | 7.9 | 0.02 |
| 2 | 7.8 | 0.03 |
| 3 | 7.4 | 0.02 |
| 4 | 7.1 | 0.01 |
| 5 | 3.0 | 0.01 |
| 6 | 10.2 | 0.04 |
| 7 | 5.2 | 0.15 |

The $H_2:CO$ in the gas exiting the partial oxidation zone can be influenced by the operating temperature of the partial oxidation. However, thermal partial oxidation is typically operated at temperatures above 1200° C. to minimize the $CH_4$ slip. The syngas data corresponding to Example 2 above is used to illustrate this relationship in Table 6.

TABLE 6

| Gasification exit $H_2:CO$ | partial oxidation Temperature (° C.) | partial oxidation exit $H_2:CO$ | mol % $CH_4$ |
|---|---|---|---|
| 1.15 | 1000 | 1.25 | 3.99% |
| 1.15 | 1050 | 1.11 | 1.13% |
| 1.15 | 1100 | 1.06 | 0.29% |
| 1.15 | 1150 | 1.01 | 0.07% |
| 1.15 | 1200 | 0.96 | 0.02% |
| 1.15 | 1250 | 0.92 | 0.01% |
| 1.15 | 1300 | 0.88 | 0.00% |
| 1.15 | 1350 | 0.84 | 0.00% |
| 1.15 | 1400 | 0.81 | 0.00% |

The invention claimed is:

1. A process for the manufacture of a useful product from waste materials and/or biomass by producing a synthesis gas from a feedstock material and subsequently converting the synthesis gas to a useful product in a conversion process having a particular $H_2:CO$ usage ratio, the process comprising:
   selecting for a first period of time a first carbonaceous feedstock material comprising or derived from waste materials and/or biomass;
   gasifying in a gasification zone at least part of the first carbonaceous feedstock material to produce a first raw synthesis gas having a first raw synthesis gas $H_2:CO$ ratio;
   partially oxidising in a partial oxidation zone at least part of the first raw synthesis gas to produce a first equilibrated synthesis gas having a first equilibrated synthesis gas $H_2:CO$ ratio controlled to be below the usage $H_2:CO$ ratio of the conversion process;
   treating at least part of the first equilibrated synthesis gas to remove impurities and generate a first fine synthesis gas; and
   subjecting at least part of the first fine synthesis gas to conversion process reaction conditions effective to produce a first useful product;

selecting for a second period of time a second carbonaceous feedstock material derived from waste materials and/or biomass, the second carbonaceous feedstock being different in its compositional characteristics from the first carbonaceous feedstock;

gasifying in the gasification zone at least part of the second carbonaceous feedstock material to produce a second raw synthesis gas having a second raw synthesis gas $H_2$:CO ratio;

partially oxidising in the partial oxidation zone at least part of the second raw synthesis gas to produce a second equilibrated synthesis gas having a second equilibrated synthesis gas $H_2$:CO ratio also controlled to be below the usage $H_2$:CO ratio of the conversion process;

treating at least part of the second equilibrated synthesis gas to remove impurities and generate a second fine synthesis gas;

and subjecting at least part of the second fine synthesis gas to conversion process reaction conditions effective to produce a second useful product;

wherein the second raw synthesis gas $H_2$:CO ratio is different from the first raw synthesis gas $H_2$:CO ratio by a percentage ±x.

2. A process according to claim 1 further comprising adjusting the $H_2$:CO ratio of at least part of the first equilibrated synthesis gas to generate an adjusted first equilibrated synthesis gas having an adjusted $H_2$:CO ratio.

3. A process according to claim 1 further comprising adjusting the $H_2$:CO ratio of at least part of the first fine synthesis gas to generate an adjusted first fine synthesis gas having an adjusted $H_2$:CO ratio.

4. A process according to claim 1 further comprising adjusting the $H_2$:CO ratio of at least part of the second equilibrated synthesis gas to generate an adjusted second equilibrated synthesis gas having an adjusted $H_2$:CO ratio.

5. A process according to claim 1 further comprising adjusting the $H_2$:CO ratio of at least part of the second fine synthesis gas to generate an adjusted second fine synthesis gas having an adjusted $H_2$:CO ratio.

6. A process according to claim 1 wherein the reaction conditions effective to produce the first and/or second useful product include a desired feed ratio of $H_2$:CO and the equilibrated synthesis gas $H_2$:CO ratio is consistently below the desired feed ratio.

7. A process according to claim 1 wherein the first and/or second useful product produced in the reaction corresponds to a certain $H_2$:CO usage ratio and the equilibrated synthesis gas $H_2$:CO ratio is consistently below that usage ratio.

8. A process according to claim 1 wherein the first and/or second useful product produced in the reaction corresponds to a certain $H_2$:CO usage ratio and the first and/or second fine synthesis gas has a $H_2$:CO ratio, wherein the $H_2$:CO ratio is consistently at or no more than 20% above or below that usage ratio.

9. A process according to claim 1 wherein x is a percentage in the range of from 1 to 300.

10. A process according to claim 1 being a continuous process wherein first and/or second carbonaceous feedstock material is continuously fed to the gasification zone for gasifying the feedstock.

11. A process according to claim 1 effective to equilibrate the $H_2$:CO ratio in the raw synthesis gas regardless of the compositional makeup of the carbonaceous feedstock.

12. A process according to claim 1 wherein the first and/or second carbonaceous feedstock material comprises at least one of woody biomass, municipal solid waste and/or commercial and industrial waste.

13. A process according to claim 1 wherein the step of gasifying the first and/or second carbonaceous feedstock material comprises gasifying the carbonaceous feedstock in the presence of steam and oxygen.

14. A process according to claim 1 wherein the the first and/or second raw synthesis gas from the gasification zone has an exit temperature of at least 600° C.

15. A process according to claim 1 wherein the partial oxidation zone is non-catalytic.

16. A process according to claim 1 wherein the partial oxidation zone operates at a temperature of least 1100° C.

17. A process according to claim 1 wherein the fine synthesis gas is low sulfur containing gas, wherein the low sulfur containing gas has a sulfur content of less than 0.1 ppmv.

18. A process according to claim 1 wherein at least a portion of the first and/or second fine synthesis gas is sent to a Hydrogen Recovery Unit (HRU), optionally wherein the HRU produces high purity hydrogen, wherein the high purity hydrogen is at least 97% pure.

19. The process according to claim 18 wherein the high purity hydrogen is used in upstream and/or downstream processes, wherein the high purity hydrogen is at least 97% pure.

20. A process according to claim 1 wherein the process further comprises the step of sequentially removing ammoniacal, sulphurous and carbon dioxide impurities from the equilibrated synthesis gas.

* * * * *